US012240062B2

United States Patent
Oyster et al.

(10) Patent No.: US 12,240,062 B2
(45) Date of Patent: Mar. 4, 2025

(54) WELD COLLET

(71) Applicant: Swagelok Company, Solon, OH (US)

(72) Inventors: Peter M. Oyster, Ravenna, OH (US); Richard A. Erhard, Medina, OH (US); Bryan S. Reiger, Willowick, OH (US); Robert Bianco, Columbia Station, OH (US); Jeremy Elek, Chagrin Falls, OH (US)

(73) Assignee: SWAGELOK COMPANY, Solon, OH (US)

( * ) Notice: Subject to any disclaimer, the term of this patent is extended or adjusted under 35 U.S.C. 154(b) by 278 days.

(21) Appl. No.: 17/574,673

(22) Filed: Jan. 13, 2022

(65) Prior Publication Data
US 2022/0134490 A1 May 5, 2022

Related U.S. Application Data

(63) Continuation of application No. 29/662,200, filed on Sep. 4, 2018, now abandoned.

(51) Int. Cl.
*B23K 37/04* (2006.01)
(52) U.S. Cl.
CPC ................... *B23K 37/0435* (2013.01)
(58) Field of Classification Search
CPC ............ B23K 37/0435; B23K 37/003; B23K 37/0533; B23K 9/0286; B23B 2231/24; B23B 31/16; B23B 31/1627; B23B 31/16275
See application file for complete search history.

(56) References Cited

U.S. PATENT DOCUMENTS

| 4,868,367 A | * | 9/1989 | Benway | B25B 5/147 |
| | | | | 219/60 A |
| 4,973,823 A | * | 11/1990 | Benway | B25B 5/163 |
| | | | | 219/161 |
| 5,323,209 A | * | 6/1994 | Ishii | G03F 7/2032 |
| | | | | 355/89 |
| 7,213,966 B2 | * | 5/2007 | Lambert | G04B 17/34 |
| | | | | 368/177 |

(Continued)

FOREIGN PATENT DOCUMENTS

| CN | 101543949 | 9/2009 |
| CN | 202555545 | 11/2012 |

(Continued)

OTHER PUBLICATIONS

International Search Report and Written Opinion from PCT/US2018/20580 dated Aug. 24, 2018.

(Continued)

*Primary Examiner* — Bayan Salone
(74) *Attorney, Agent, or Firm* — Calfee, Halter & Griswold LLP

(57) ABSTRACT

A collet member for a colleting fixture includes a monolithic collet body having a clamping block engaging outer wall and a workpiece engaging inner wall extending circumferentially between first and second end walls, with each of the outer wall, the inner wall, and the first and second end walls extending axially between first and second radial walls to enclose at least one internal cavity.

20 Claims, 7 Drawing Sheets

(56) References Cited

U.S. PATENT DOCUMENTS

| | | | |
|---|---|---|---|
| 7,866,532 B1 * | 1/2011 | Potter | B23K 20/126 |
| | | | 228/44.5 |
| D771,167 S | 11/2016 | Fukaya | |
| D775,249 S | 12/2016 | Furujo | |
| D852,856 S | 7/2019 | Beagen | |
| D873,864 S | 1/2020 | Bell | |
| D889,520 S | 7/2020 | Hawley | |
| D893,967 S | 8/2020 | Vazquez | |
| D907,069 S | 1/2021 | Bell | |
| D924,939 S | 7/2021 | Bell | |
| 2005/0219957 A1 * | 10/2005 | Lambert | G04B 17/34 |
| | | | 368/177 |
| 2006/0051609 A1 | 3/2006 | Banker | |
| 2006/0157536 A1 * | 7/2006 | Wolf | B23K 9/0286 |
| | | | 228/101 |
| 2007/0023977 A1 | 2/2007 | Braun et al. | |
| 2017/0066098 A1 * | 3/2017 | Schweigert | B25B 5/163 |
| 2018/0257201 A1 * | 9/2018 | Zellweger | B23K 37/0533 |

FOREIGN PATENT DOCUMENTS

| | | | | |
|---|---|---|---|---|
| CN | 106198291 | | 12/2016 | |
| CN | 107283340 | | 10/2017 | |
| DE | 10340052 | | 5/2005 | |
| DE | 102009038433 | | 2/2011 | |
| EP | 2853323 | | 4/2015 | |
| EP | 2995231 | | 3/2016 | |
| EP | 2995231 A1 | * | 3/2016 | ............... A47K 3/40 |
| GB | 2338914 | | 1/2000 | |
| JP | 2003344642 | | 12/2003 | |
| JP | 2016147326 | | 8/2016 | |
| JP | 2016147326 A | * | 8/2016 | |

OTHER PUBLICATIONS

Srivatsan et al. "Additive Manufacturing of Metals via Selective Laser Melting: Process Aspects and Material Developments", in: "Additive Manufacturing: Innovations", Sep. 25, 2015, pp. 70-78.

\* cited by examiner

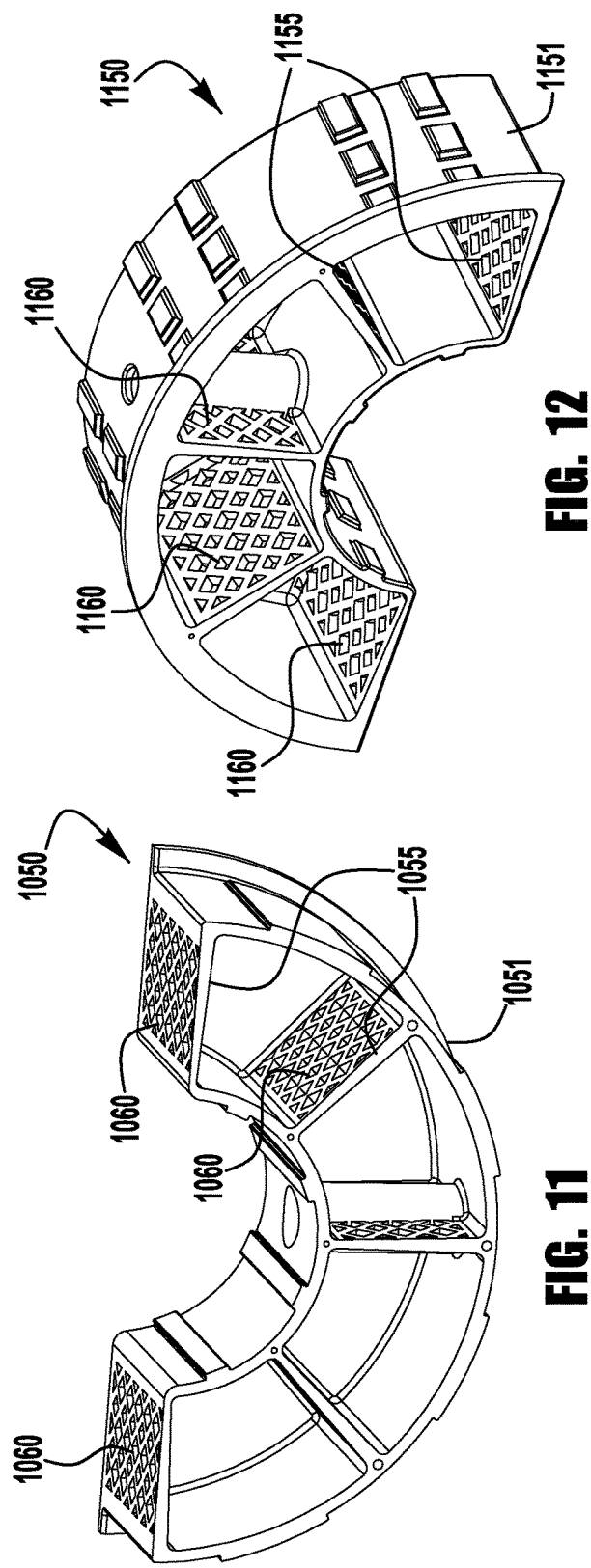
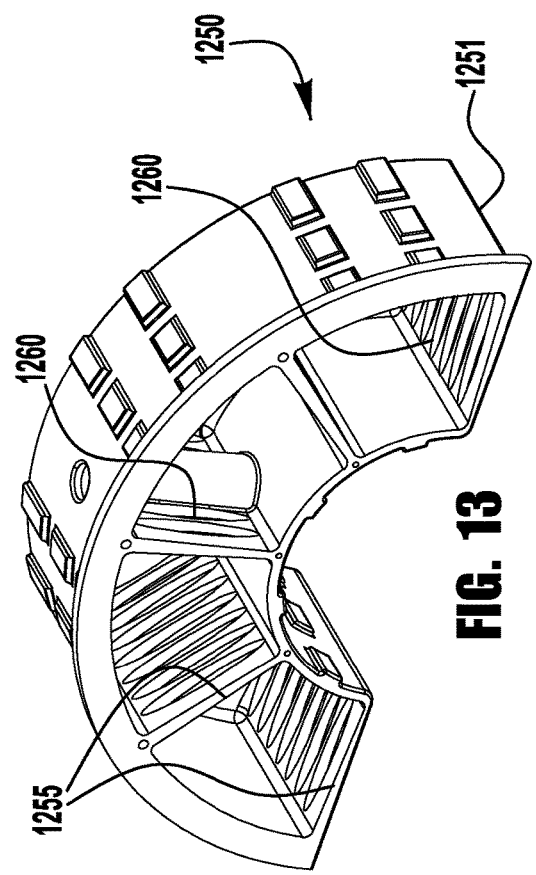
FIG. 11
FIG. 12
FIG. 13

WELD COLLET

CROSS-REFERENCE TO RELATED APPLICATION

This application is a continuation of U.S. Design patent application Ser. No. 29/662,200, filed on Sep. 4, 2018, for WELD COLLET, the entire disclosure of which is fully incorporated herein by reference.

BACKGROUND

The use of rigid collets for holding tubing and other workpieces during welding operations has often been preferred over split or adjustable collets, due to the ability of the rigid collets to minimize misalignment between the workpieces being welded (e.g., due to thermal stresses). Referring to FIG. 1, a conventional rigid collet (shown, for example, in U.S. Pat. No. 4,868,367, the entire disclosure of which is incorporated herein by reference) includes a pair of solid, semi-cylindrical collet members 48, 50 retained in opposed clamp halves or clamping blocks 22, 24 of a clamp assembly 10. As shown, the collet elements define a cylindrical interior clamping surface 56 for securely positioning and retaining a cylindrical workpiece (e.g. a tube). The extended cylindrical clamping surface and solid collet construction, while providing for rigid, secure colleting of the workpieces, may contribute to increased heat transfer away from the workpieces, particularly for workpiece materials having high thermal conductivity, such as copper.

SUMMARY

According to an exemplary aspect of the present application, a collet member for a colleting fixture includes a monolithic collet body having a clamping block engaging outer wall and a workpiece engaging inner wall extending circumferentially between first and second end walls, with each of the outer wall, the inner wall, and the first and second end walls extending axially between first and second radial walls to enclose at least one internal cavity.

According to another exemplary aspect of the present application, a colleting fixture includes first and second clamping blocks and first and second collet members secured to corresponding ones of the first and second clamping blocks. The first and second clamping blocks are joinable such that the first and second collet members together define a workpiece engaging collet. At least one of the first and second collet members comprises a monolithic collet body including a clamping block engaging outer wall and a workpiece engaging inner wall extending circumferentially between first and second end walls, each of the outer wall, the inner wall, and the first and second end walls extending axially between first and second radial walls to enclose at least one internal cavity.

According to another exemplary aspect of the present application, a method of clamping a workpiece for a welding operation is contemplated. In one such exemplary method, first and second collet members are secured to first and second clamping blocks. The first and second clamping blocks are joined such that the first and second collet members together define a workpiece engaging collet. At least one of the first and second collet members comprises a monolithic collet body including a clamping block engaging outer wall and a workpiece engaging inner wall extending circumferentially between first and second end walls, with each of the outer wall, the inner wall, and the first and second end walls extending axially between first and second radial walls to enclose at least one internal cavity. The workpiece is engaged between inner walls of the first and second collet members. A cooling fluid is circulated through the at least one internal cavity of the at least one of the first and second collet members.

BRIEF DESCRIPTION OF THE DRAWINGS

Further advantages and benefits will become apparent to those skilled in the art after considering the following description and appended claims in conjunction with the accompanying drawings, in which:

FIG. 11 is a perspective view of another collet for a workpiece holding fixture, in accordance with another exemplary embodiment of the present application;

FIG. 12 is a perspective view of another collet for a workpiece holding fixture, in accordance with another exemplary embodiment of the present application;

FIG. 13 is a perspective view of another collet for a workpiece holding fixture, in accordance with another exemplary embodiment of the present application;

DETAILED DESCRIPTION

Figure 1:
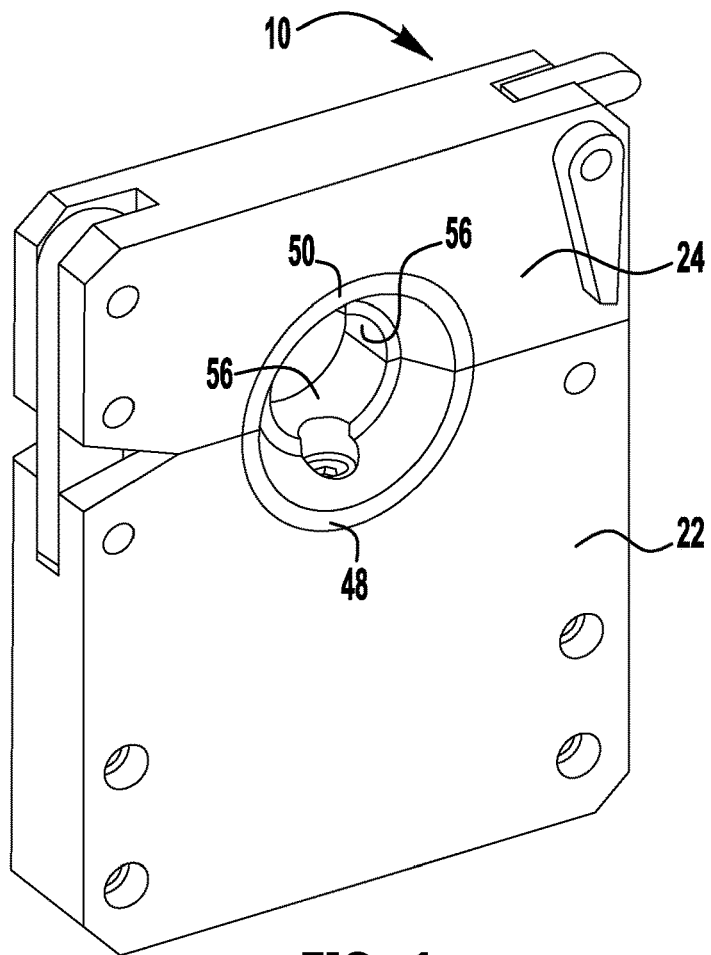
FIG. 1 is a perspective view of a fixture for holding a workpiece.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The Detailed Description merely describes exemplary embodiments and is not intended to limit the scope of the claims in any way. Indeed, the invention as claimed is broader than and unlimited by the exemplary embodiments, and the terms used in the claims have their full ordinary meaning. For example, while specific exemplary embodiments in the present application describe collets for use with weld fixtures in orbital welding systems, one of more of the features described herein may additionally or alternatively be applied to other types of welding systems, or for use in other types of fixturing applications. Additionally, while the geometries and arrangements of many of the collets described herein are such that their production is facilitated by additive manufacturing, other manufacturing methods may be utilized to fabricate collets having one or more of the features described herein, such as, for example, stacked plate assembly, machining, welding, brazing, and casting (e.g., investment casting, sand casting, lost wax casting).

Figure 2:
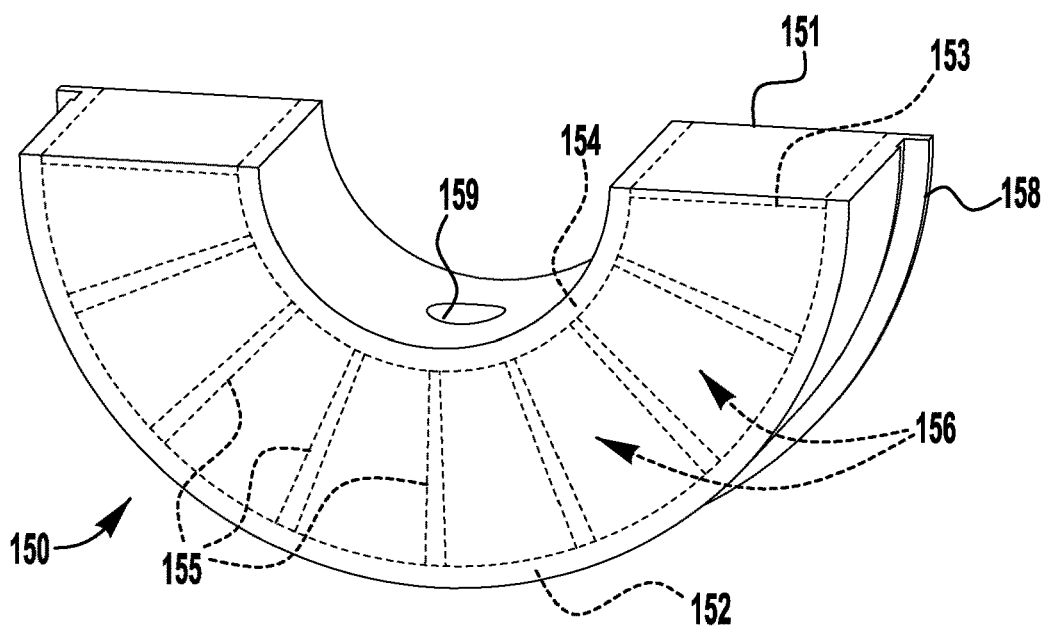
FIG. 2 is a perspective view of a collet for a workpiece holding fixture, in accordance with an exemplary embodiment of the present application.

FIG. 2 illustrates an exemplary collet member 150 for use with a weld fixture (e.g., the exemplary fixture assembly 10 of FIG. 1). While the exemplary collet member 150 has a semi-cylindrical body 151, other collet body shapes may alternatively be utilized (e.g., rectangular, hex-shaped). The collet body 151 includes a clamping block engaging outer portion (shown schematically at 152), a workpiece engaging inner portion (shown schematically at 154), and an intermediate portion (shown schematically at 153) extending radially between the outer portion 152 and the inner portion 154. The exemplary collet member 150 also includes an outer radial flange 158 for abutting the exterior side (i.e. opposite the weld side) of the clamping block to axially position the collet member 150, and a radially extending fastener bore 159 for receiving a fastener for affixing the collet member 150 to the clamping block.

According to an aspect of the present application, a collet member for a weld fixture may be configured to provide for reducing heat transfer away from a fixtured workpiece during welding. Referring to FIG. 2, in an exemplary embodiment, the inner portion 154 of the collet body 151 may have a reduced thermal conductivity compared to the outer portion 152 of the collet body, to reduce heat transfer from the workpiece. In one such embodiment, the inner portion 154 of the collet body 151 may be provided in a different material than the outer portion 152, having a lower thermal conductivity. For example, the inner portion 154 of the collet body 151 may comprise titanium alloys such as Ti-6A1-4V, zirconium and its alloys, nickel-base alloys such as Hastelloy C and X, Inconel alloy 625 and 718, and Monel alloy 400 and K-500, cobalt-base alloys such as Haynes 25 and CoCr derivatives, or any suitable material having a relatively low thermal conductivity (e.g., less than 20 W/mK) and the outer portion 152 may comprise stainless steel, aluminum and its alloys, copper and its alloys such as brass and bronze, or any suitable material having a higher thermal conductivity (e.g., greater than 20 W/mK). Material compatibility may be a consideration when selecting material pairs. The use of different materials may, for example, provide for cost efficiencies, and/or desirable variations in density, heat capacity, and/or corrosion behavior/resistance. In another exemplary embodiment, the inner portion 154 of the collet body 151 may have a greater material porosity (e.g., void volume fraction greater than about 15%) than the outer portion 152, with the greater porosity providing for a reduced thermal conductivity.

The workpiece engaging inner portion material of the collet body may additionally or alternatively be configured to provide other desirable properties, including, for example, increased elasticity, corrosion behavior/resistance, and/or density.

While variations in materials or material properties in the collet member may be accomplished by mechanically fixing outer radial and inner radial components together to form the collet body, according to another aspect of the present application, additive manufacturing may be utilized to produce a monolithic collet body having the desired properties across the radial thickness of the collet body. Examples of additive manufacturing techniques that may be utilized include, for example: laser powder bed fusion (direct metal laser sintering or "DMLS," selective laser sintering/melting or "SLS/SLM," or layered additive manufacturing or "LAM"), electron beam powder bed fusion (electron beam melting or "EBM"), ultrasonic additive manufacturing ("UAM"), or direct energy deposition (laser powder deposition or "LPD," laser wire deposition or "LWD," laser engineered net-shaping or "LENS," electron beam wire deposition). Providing the collet body as a single, monolithic component may eliminate assembly costs, reduce component wear, reduce adverse effects from heat cycling, improve corrosion behavior (galvanic effects, crevice, stress corrosion cracking), and reduce lead time to manufacture.

According to another aspect of the present application, heat transfer away from a fixtured workpiece may be reduced by reducing the material mass of the collet member, and/or providing cavities or air gaps in the collet member that impede thermal conduction. In one such embodiment, the intermediate portion 153 of the collet body 151 may include a plurality of rigid, radially extending members 155 (e.g., ribs, pins, fins, blades, etc.) extending between the outer portion 152 and the inner portion 154 to define a plurality of cavities 156.

Figure 3:
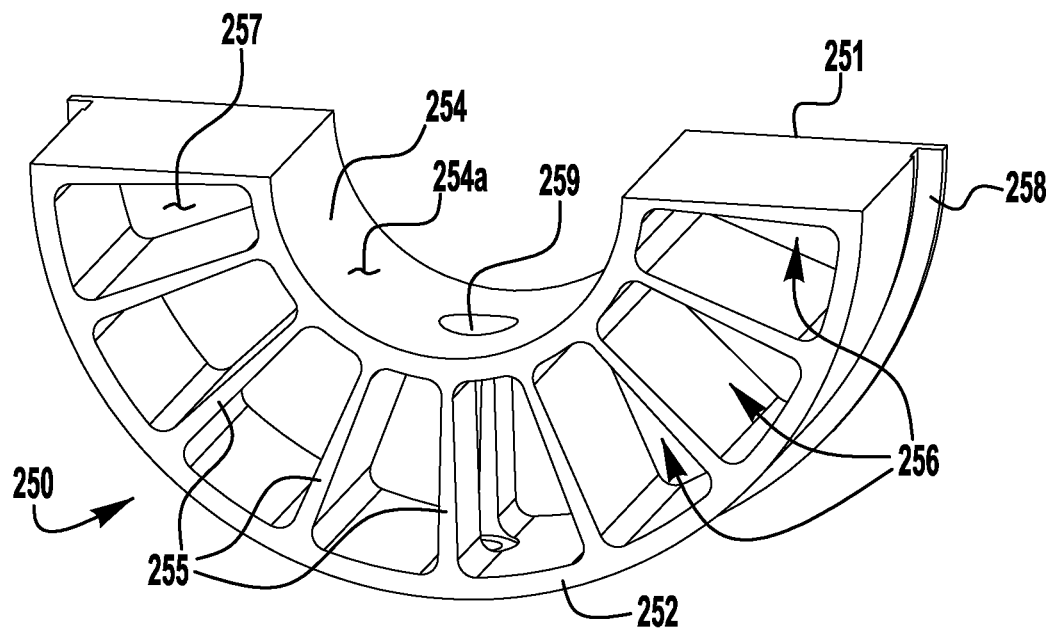
FIG. 3 is a perspective view of another collet for a workpiece holding fixture, in accordance with another exemplary embodiment of the present application.
Figure 14A:
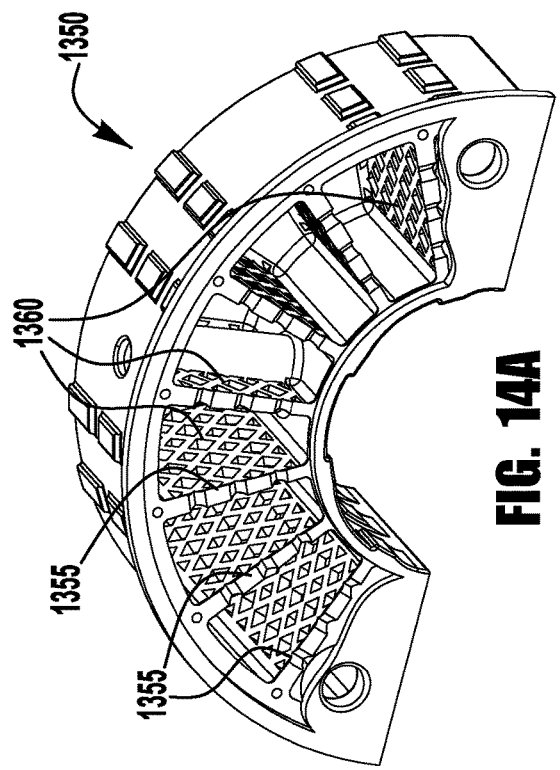
FIG. 14A is a perspective view of the collet of FIG. 14, with a portion of the rear wall cut away to illustrate internal features of the collet.
Figure 14:
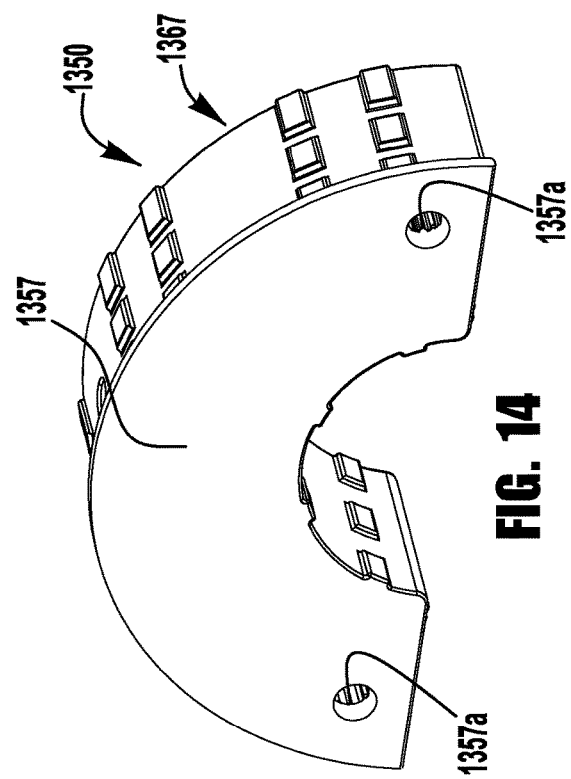
FIG. 14 is a perspective view of another collet for a workpiece holding fixture, in accordance with another exemplary embodiment of the present application.
Figure 15:
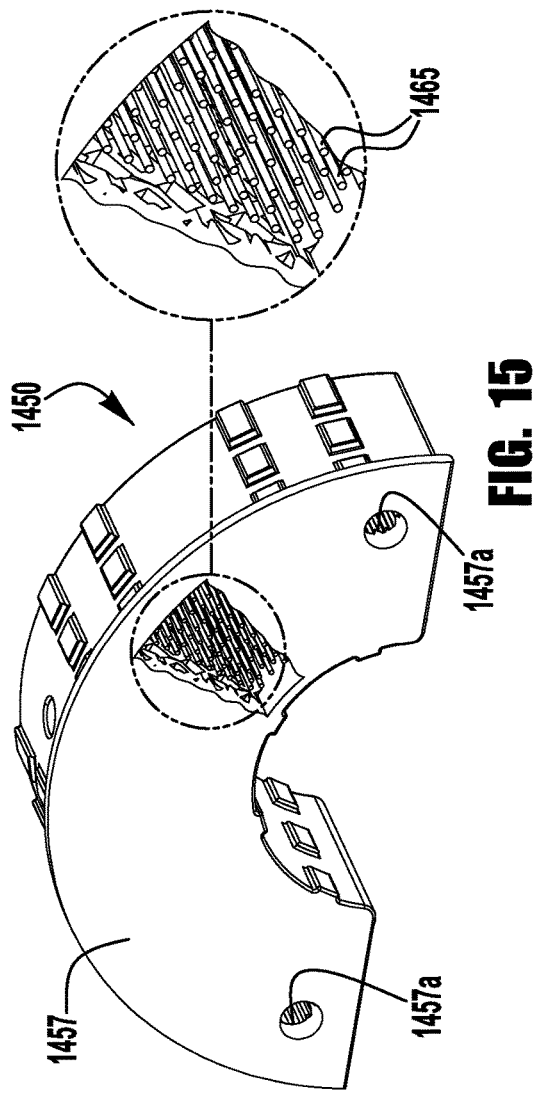
FIG. 15 is a perspective view of another collet for a workpiece holding fixture, with a portion of the rear wall cut away to illustrate internal features of the collet.

FIG. 3 illustrates an exemplary collet member 250 including a collet body 251 having an outer semi-cylindrical wall portion 252 for engagement with a clamping block, an inner semi-cylindrical wall portion 254 for engaging a workpiece (e.g., a tube end or other cylindrical workpiece), and a plurality of ribs 255 extending from the outer wall portion 252 to the inner wall portion 254 to define a plurality of cavities 256. While the cavities may extend across the entire axial length of the collet member 250, in the illustrated embodiment, a radial wall 257 is provided on a first axial side of the collet body 251, to define a closed end of the cavities 256. When used, for example, in an orbital weld fixture, this closed condition may be desirable for containment of the weld gases during the welding operation. In the illustrated embodiment, the radial wall 257 is disposed on the exterior side (i.e., opposite the weld side) of the collet member 250, in axial alignment with the outer flange 258. Additionally or alternatively, the radial wall 257 may provide further rigid reinforcement for the collet member 250 during clamping. In other embodiments (not shown), the radial wall may be disposed on the interior side (i.e., the weld side) of the collet member, for example, to reduce the volume to be filled by the weld gas. In still other embodiments, as shown in FIGS. 14 and 15 and discussed in greater detail below, radial walls may be provided on both axial sides of the collet body, for example, to provide additional reinforcement, such that the cavities are fully enclosed between the first and second radial walls. Fabrication of an enclosed cavity collet member may be facilitated by the use of additive manufacturing techniques, such as, for example, the techniques described in greater detail above.

Figure 4:
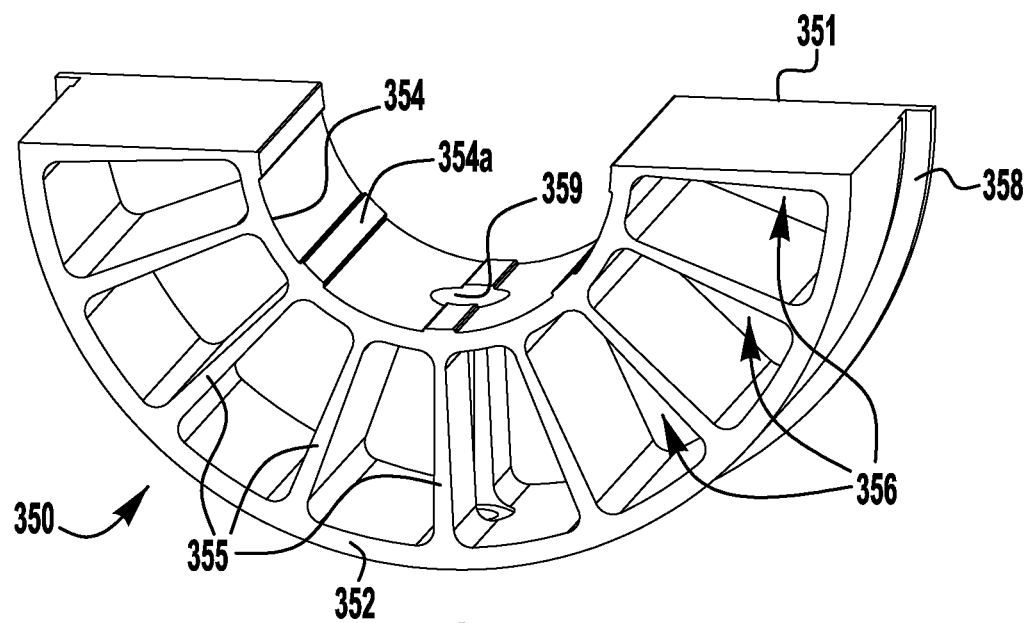
FIG. 4 is a perspective view of another collet for a workpiece holding fixture, in accordance with another exemplary embodiment of the present application.

While the inner wall portion 254 of the collet body may provide a semi-cylindrical workpiece engaging surface 254a, as shown in FIG. 3, in other embodiments, the inner wall portion may include one or more radially inward extending protrusions sized and positioned to reduce the contact surface between the collet member and the workpiece. FIG. 4 illustrates an exemplary collet member 350 having a collet body 351 with an inner wall portion 354 having a plurality of radially inward extending protrusions 354a defining a reduced workpiece engaging surface, for example, to reduce heat transfer between the workpiece and the collet member 350. These protrusions may, but need not, comprise a different material or material property than the intermediate and/or outer portions of the collet body 351, for example to provide a reduced thermal conductivity (as described above), increased elasticity, improved corrosion behavior, and/or allowance for variations in dimension or shape of the workpiece engaging protrusions. As shown, the protrusions 354a may extend the entire axial length of the collet member 350. Alternatively, as shown in FIG. 13, the protrusions may be notched or gapped to further reduce engaging surfaces. As shown in FIGS. 11-13, similar protrusions may be provided on the outer wall portions, for example, to reduce surface contact between the collet member and the collet clamping block.

Figure 5:
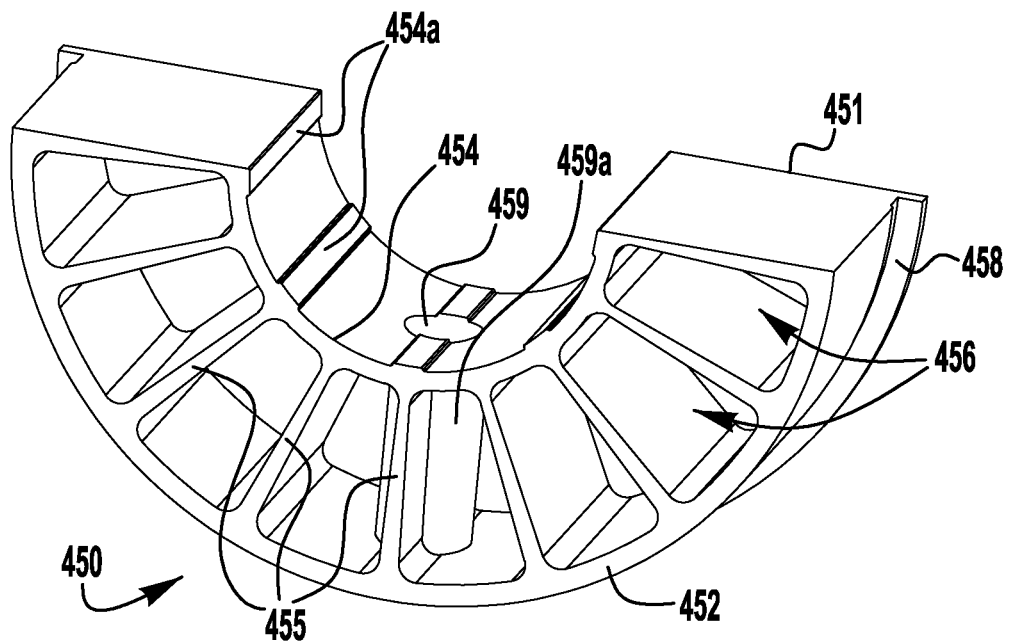
FIG. 5 is a perspective view of another collet for a workpiece holding fixture, in accordance with another exemplary embodiment of the present application.

In the collet members 250, 350 of FIGS. 3 and 4, the radially extending fastener bore 259, 359 intersects one of the ribs 255, 355, for example, to facilitate positioning and alignment of the installed fastener (not shown) when affixing the collet member 250, 350 to the clamping block. In another embodiment, a hollow fastener boss may be formed between the inner wall portion and the outer wall portion of a collet member, for example, to retain and guide the fastener when affixing the collet member to a clamping block. This fastener boss may intersect one of the radially extending members, for example, for further reinforcement. FIG. 5 illustrates an exemplary collet member 450 having a collet body 451 with a hollow fastener boss 459a defining the fastener bore 459 and extending between the outer and inner wall portions 452, 454 and intersecting one of the radially extending ribs 455.

While the collet ribs described herein may form substantially solid, plate-like extensions between the inner and outer wall portions of a collet, in other embodiments, one or more of the ribs may be provided with one or more cutouts, for example, to further reduce the material mass of the collet member and/or to provide additional cavities or air gaps in the collet member that impede thermal conduction, thereby reducing the heat transfer away from a fixtured workpiece. These cutouts may produce a lattice pattern in the ribs, which may be configured to facilitate fabrication using additive manufacturing techniques, for example, by allowing both the internal and external surfaces of the collet to be self-supporting, and/or by enhancing mechanical strength or support for the component.

FIGS. 11-13 illustrate exemplary collet members 1050, 1150, 1250 including a collet body 1051, 1151, 1251 similar to the collet bodies 251, 351, 451 of FIGS. 3-5, with openings, apertures, or cutouts 1060, 1160, 1260 formed in the ribs 1055, 1155, 1255 to provide a lattice pattern in the ribs. In the embodiments of FIGS. 11 and 12, the cutouts 1060, 1160 are diamond-shaped and arranged to provide rigid, intersecting solid walls arranged for enhanced mechanical strength, and for manufacturability using 3D printing or other additive manufacturing techniques. In the embodiment of FIG. 13, the cutouts 1260 are radially extending ovals arranged to provide radially extending walls that widen at the ends, which also provides for enhanced mechanical strength, and for manufacturability using 3D printing or other additive manufacturing techniques.

According to another aspect of the present disclosure, openings or lattice patterns in the collet ribs may also facilitate circulation of cooling fluid through the weld collet member to decrease the thermal transfer from the workpiece to the fixture block. In one such embodiment, as shown in FIGS. 14 and 14A, an enclosed (e.g., by radial walls 1357, 1367 and non-apertured endmost ribs 1355), at least partially hollow collet member 1350 may include cooling fluid ports 1357a in one or both radial end walls 1357, 1367, positioned to allow for the passage of cooling fluid (e.g., air, nitrogen, argon, water, or other cooling gases or liquids) through openings 1360 in the ribs 1355. In other embodiments, as shown in FIG. 15, the ribs may be replaced by, or supplemented with, axially extending reinforcing structures (e.g., reinforcing rods 1465, as shown) that provide axial bracing or reinforcement of the collet member 1450, while permitting the passage of cooling fluid through the hollow collet member. The selected rib lattice pattern, and/or shape and arrangement of the supporting rods may provide increased surface area for contact with the cooling fluid.

To further facilitate thermal transfer from the collet body to the cooling fluid, the support structure(s) of the collet body intermediate portion (e.g., ribs and/or rods) may be formed from a material having a greater thermal conductivity, compared to the inner and outer wall portions of the collet body. For example, the support structure(s) may be formed with a smaller porosity, or from a greater thermal conductivity metal, such as stainless steel, aluminum and its alloys, copper and its alloys such as brass and bronze, or any suitable material having a higher thermal conductivity (e.g., greater than 20 W/mK), while the inner and outer wall portions may be formed with a greater porosity, or from a smaller thermal conductivity material, such as Hastelloy C and X, Inconel alloy 625 and 718, and Monel alloy 400 and K-500, cobalt-base alloys such as Haynes 25 and CoCr derivatives, or any suitable material having a relatively low thermal conductivity (e.g., less than 20 W/mK).

Figure 6:
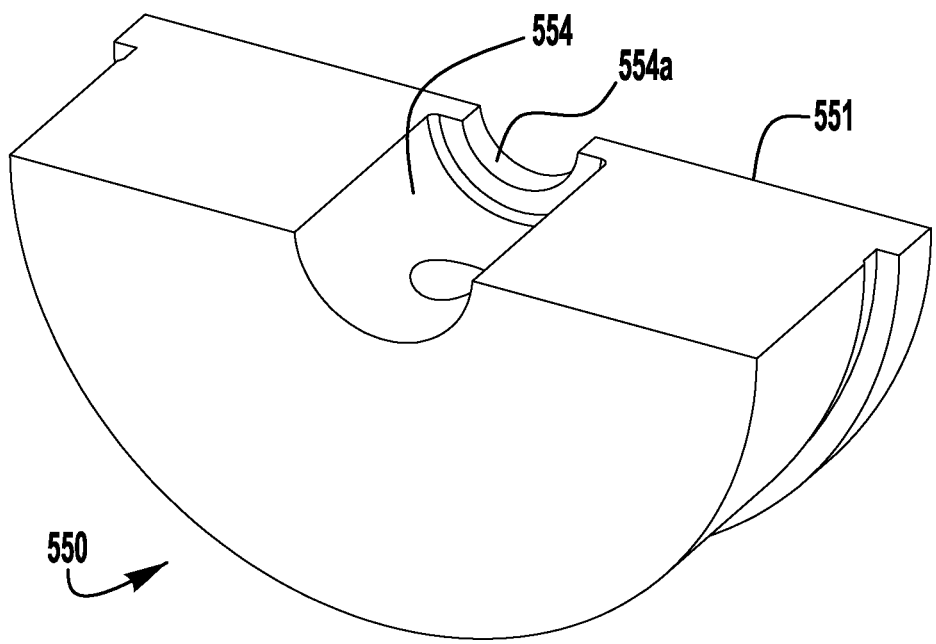
FIG. 6 is a perspective view of another collet for a workpiece holding fixture, in accordance with another exemplary embodiment of the present application.
Figure 7:
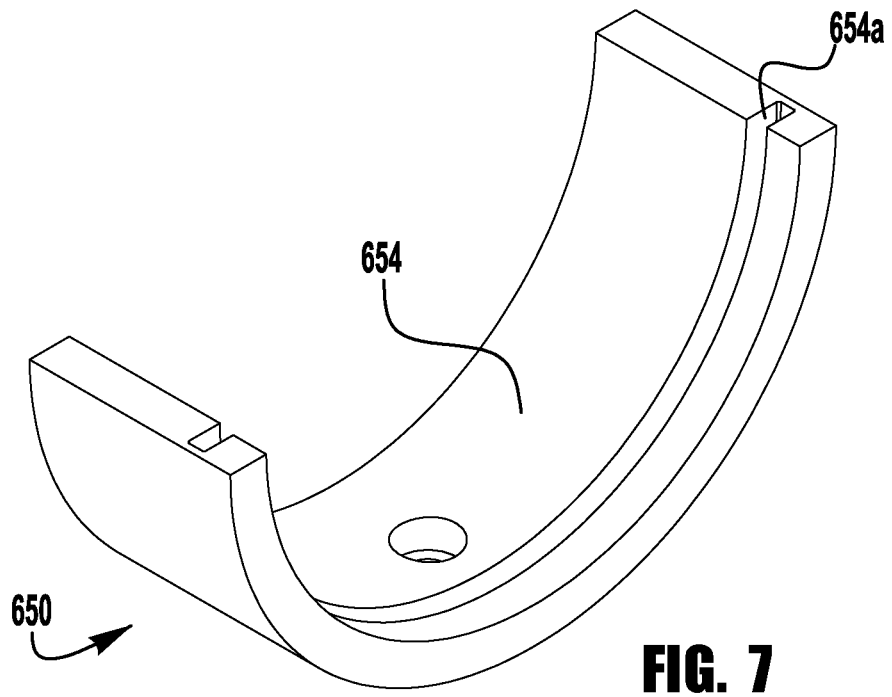
FIG. 7 is a perspective view of another collet for a workpiece holding fixture, in accordance with another exemplary embodiment of the present application.
Figure 8:
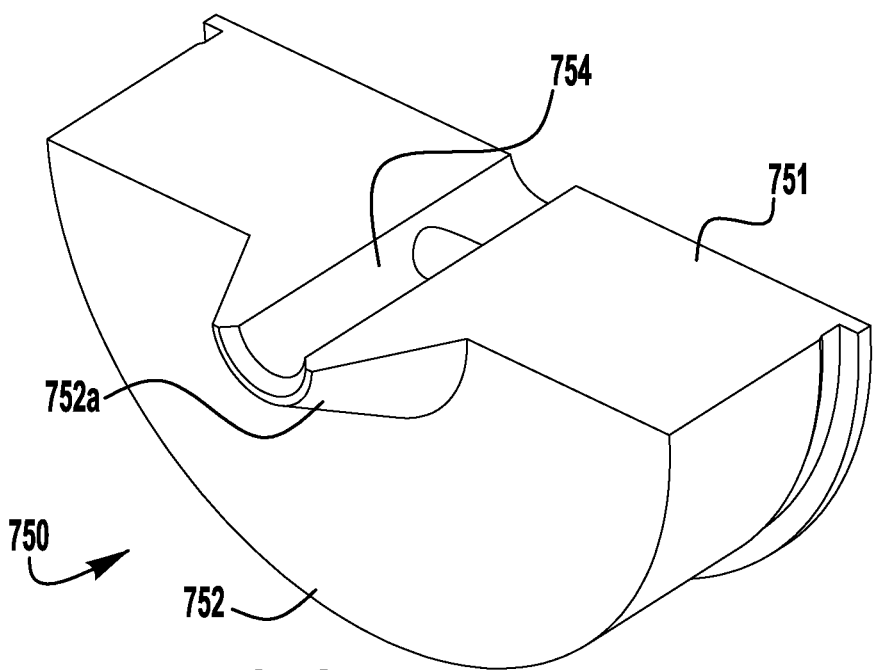
FIG. 8 is a perspective view of another collet for a workpiece holding fixture, in accordance with another exemplary embodiment of the present application.
Figure 9:
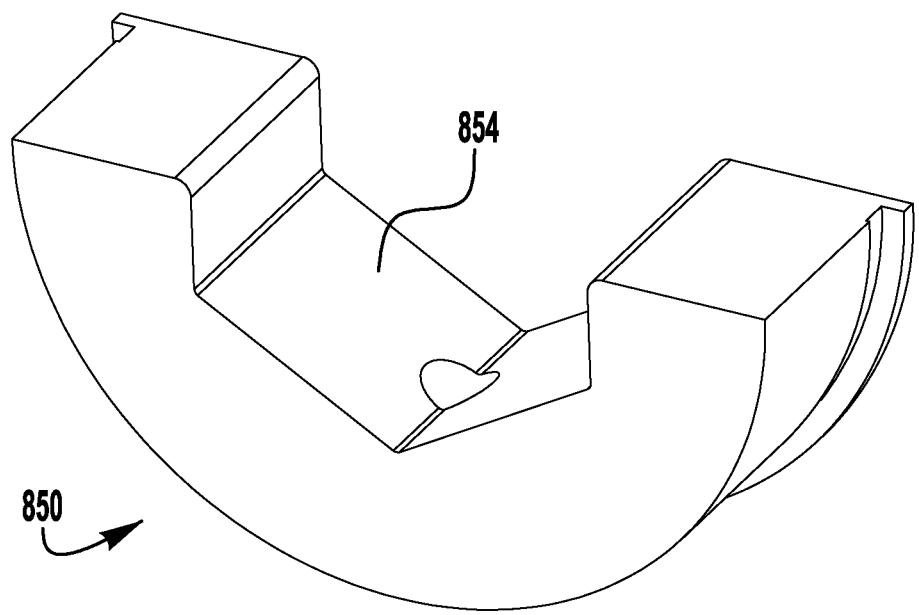
FIG. 9 is a perspective view of another collet for a workpiece holding fixture, in accordance with another exemplary embodiment of the present application.
Figure 10:
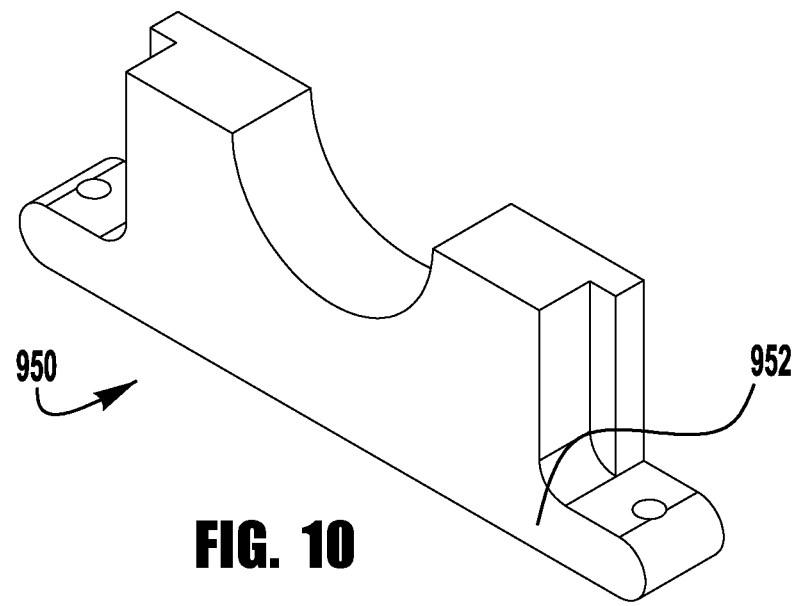
FIG. 10 is a perspective view of another collet for a workpiece holding fixture, in accordance with another exemplary embodiment of the present application.

Additive manufacturing techniques for fabricating collet members, as described herein, may additionally be used to fabricate special, customer specific colleting configurations, for example, without requiring expensive and time-consuming casting processes. These techniques may be used, for example, to produce collet members having alternative geometries. For example, FIGS. 6 and 7 each illustrate an exemplary collet member 550, 650 having a modified inner diameter or inner workpiece engaging portion 554, 654, for example, to provide clearance for a non-cylindrical outer portion of a workpiece (e.g., a flange or other radial extension). In the exemplary embodiment of FIG. 6, a radially extending lip 554a is provided to engage the workpiece, providing radial clearance between the lip and the surface of the inner wall portion 554. In the exemplary embodiment of FIG. 7, a radially recessed groove 654a in the inner wall portion 654 provides clearance for a radially extending portion of the workpiece. As another example, FIG. 8 illustrates an exemplary collet member 650 having a modified outer wall portion 752 (e.g., with cone shaped extension 752a), for example, to axially extend the collet body 751 to provide an axially extended inner wall portion 754 without extending the clamping block engaging portion of the outer wall portion. As another example, FIG. 9 illustrates a collet member 850 having an inner wall portion 854 defining a non-cylindrical workpiece engaging surface (as shown, a hex-shaped surface, but other shapes and contours may be provided). FIG. 10 illustrates a different type of collet member 950, having a non-cylindrical outer wall portion 952.

The inventive aspects have been described with reference to the exemplary embodiments. Modification and alterations will occur to others upon a reading and understanding of this specification. It is intended to include all such modifications and alterations insofar as they come within the scope of the appended claims or the equivalents thereof.

We claim:

1. A collet member for a colleting fixture, the collet member comprising:
   a monolithic collet body including a clamping block engaging outer wall and a workpiece engaging inner wall extending circumferentially between first and second end walls, each of the outer wall, the inner wall, and the first and second end walls extending axially between first and second radial walls, such that the first end wall, the second end wall, the outer wall, the inner wall, the first radial wall, and the second radial wall together enclose at least one internal cavity.

2. The collet member of claim 1, further comprising first and second cooling fluid ports for supplying cooling fluid to the at least one internal cavity.

3. The collet member of claim 2, wherein the first and second cooling fluid ports are disposed in at least one of the first and second radial walls.

4. The collet member of claim 1, further comprising one or more support structures extending axially from the first radial wall to the second radial wall.

5. The collet member of claim 4, wherein the one or more support structures extend radially from the inner wall to the outer wall to define a plurality of internal cavities within the collet body.

6. The collet member of claim 5, wherein each of the one or more support structures includes at least one aperture to permit fluid flow between the plurality of internal cavities.

7. The collet member of claim 5, wherein each of the one or more support structures includes an apertured lattice pattern.

8. The collet member of claim 4, wherein the one or more support structures comprises a plurality of axially extending rods.

9. The collet member of claim 1, further comprising one or more support structures extending radially from the inner wall to the outer wall.

10. The collet member of claim 2, wherein the at least one internal cavity defines a flow path between the first and second cooling ports.

11. The collet member of claim 1, wherein the outer wall comprises a semi-cylindrical outer wall.

12. The collet member of claim 1, wherein the inner wall comprises a semi-cylindrical inner wall defining a semi-cylindrical workpiece engaging surface.

13. The collet member of claim 1, wherein the inner wall comprises a plurality of radially inward extending protrusions defining a plurality of discrete workpiece engaging surfaces.

14. The collet member of claim 1, wherein the outer wall comprises a plurality of radially outward extending protrusions defining a plurality of discrete clamping block engaging surfaces.

15. The collet member of claim 1, further comprising a hollow fastener boss extending from the outer wall to the inner wall.

16. A collet member for a colleting fixture, the collet member comprising:
   a monolithic collet body including a clamping block engaging outer wall and a workpiece engaging inner wall extending circumferentially between first and second end walls, and one or more ribs extending radially from the inner wall to the outer wall, each of the outer wall, the inner wall, the first and second end walls, and the one or more ribs extending axially to define a plurality of cavities within the collet body;
   wherein each of the one or more ribs includes an apertured lattice pattern.

17. The collet member of claim 16, wherein the inner wall comprises a plurality of radially inward extending protrusions defining a plurality of discrete workpiece engaging surfaces.

18. The collet member of claim 16, wherein the outer wall comprises a plurality of radially outward extending protrusions defining a plurality of discrete clamping block engaging surfaces.

19. The collet member of claim 16, wherein each of the outer wall, the inner wall, the first and second end walls, and the one or more ribs extending axially from a radial wall to define the plurality of cavities.

20. The collet member of claim 16, wherein each of the outer wall, the inner wall, the first and second end walls, and the one or more ribs extending axially from a first radial wall to a second radial wall to enclose the plurality of cavities.

\* \* \* \* \*